Oct. 19, 1965  H. FREEMAN ETAL  3,213,444
ANALOG-DIGITAL CONVERTER
Filed Feb. 28, 1961  2 Sheets-Sheet 1
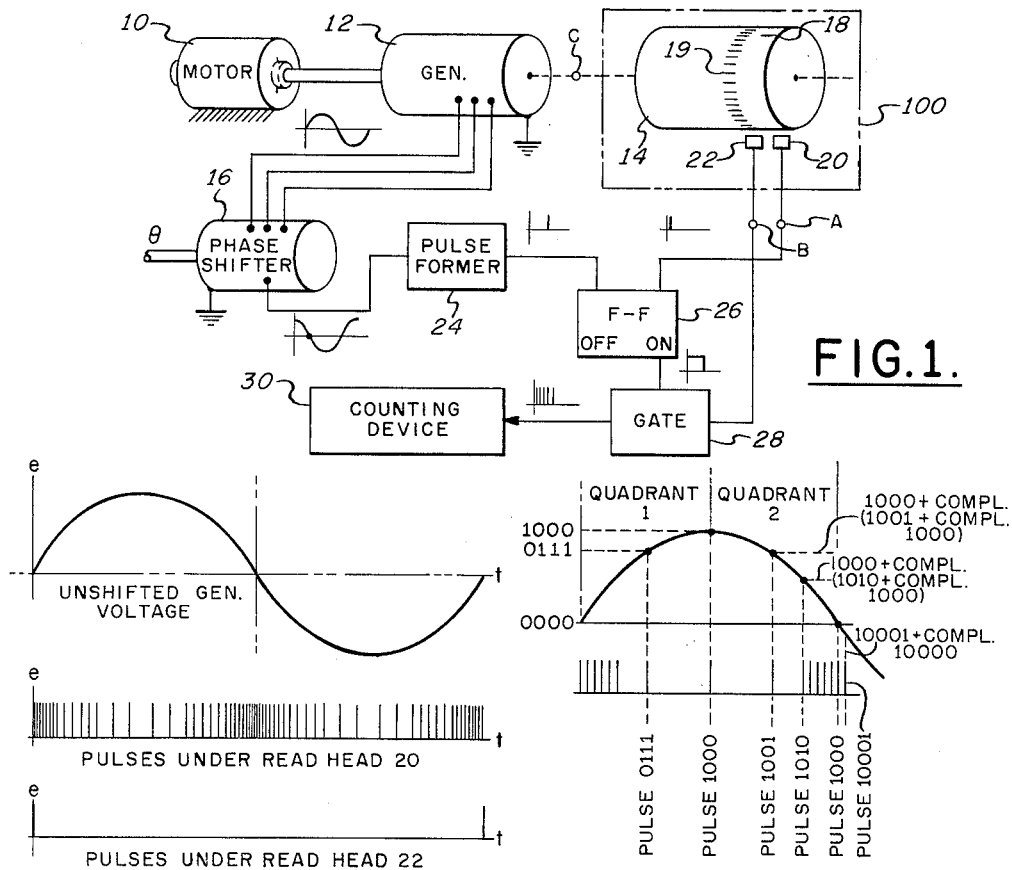
FIG.1.
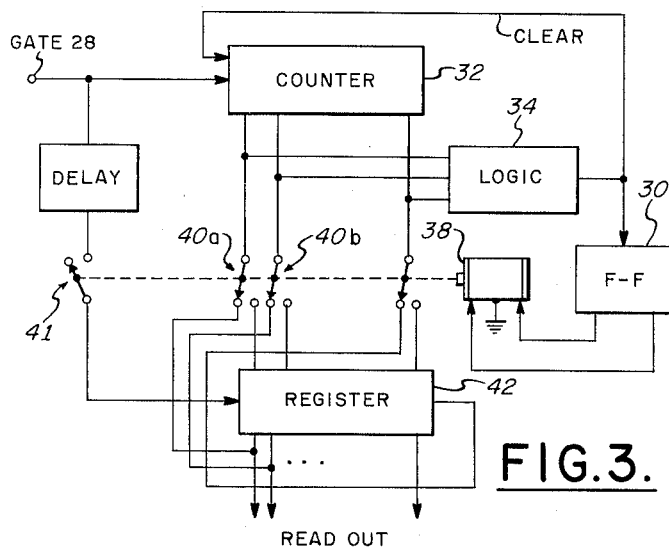
FIG.2.
FIG.4.
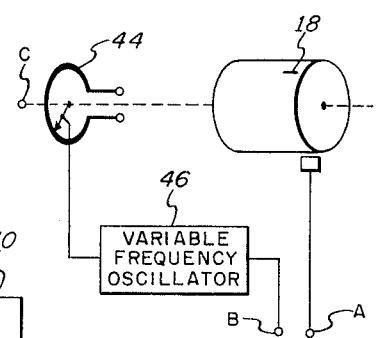
FIG.3.
FIG.5.
INVENTORS
HERBERT FREEMAN
OSCAR LOWENSCHUSS
BY
ATTORNEY

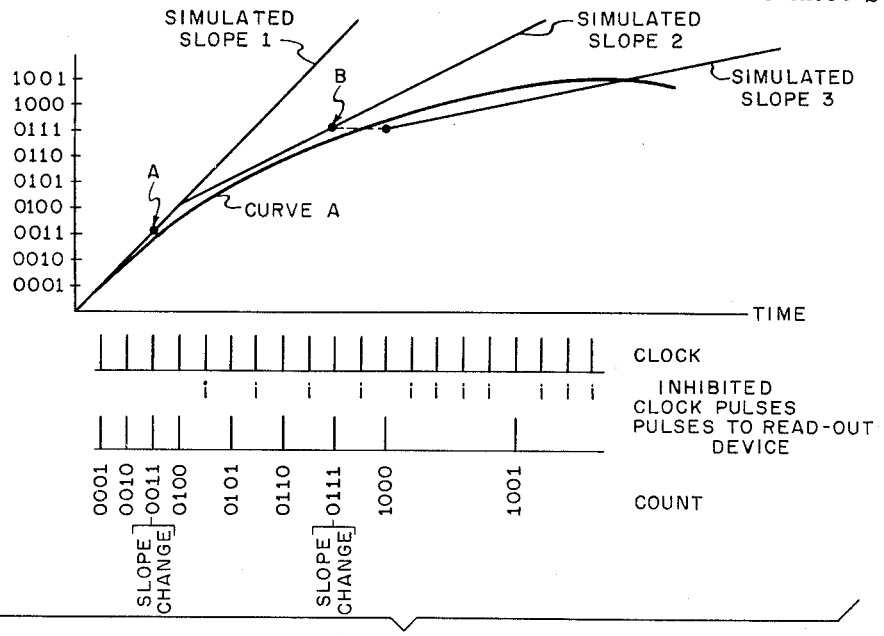
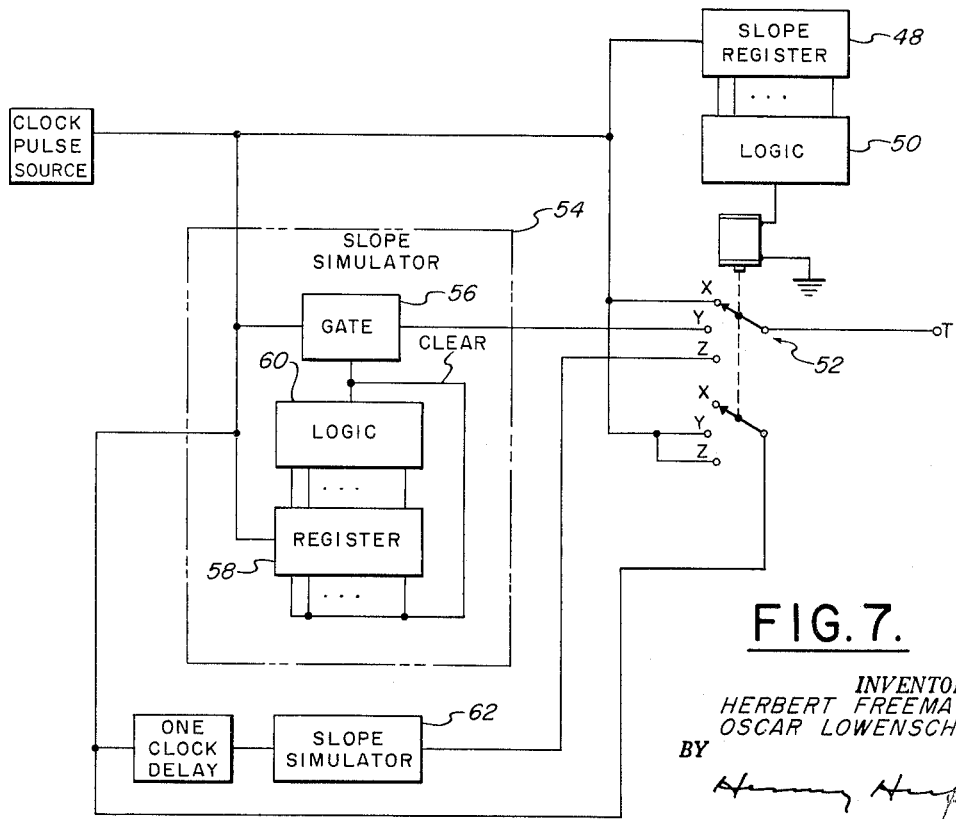
FIG.7.
INVENTORS
HERBERT FREEMAN
OSCAR LOWENSCHUSS
BY
ATTORNEY United States Patent Office 3,213,444
Patented Oct. 19, 1965

3,213,444
ANALOG-DIGITAL CONVERTER
Herbert Freeman, Great Neck, N.Y., and Oscar Lowenschuss, Lexington, Mass., assignors to Sperry Rand Corporation, Great Neck, N.Y., a corporation of Delaware
Filed Feb. 28, 1961, Ser. No. 92,203
2 Claims. (Cl. 340—347)

This invention relates generally to analog-to-digital converters and more particularly to apparatus for converting an analog representation of an independent variable directly into a digital representation of a dependent variable relative thereto, e.g. apparatus for converting the angle that a shaft rotates directly into a digital representation of the sine of that angle.

The invention is based on the following fact: when an independent variable, e.g. a shaft angle $\theta$, is varied linearly with respect to time, i.e. $\Delta\theta = k\Delta t$, and pulses are provided at a rate proportional to the derivative of a dependent variable with respect to that independent variable, i.e.

$$\frac{\Delta \sin \theta}{\Delta \theta} = k' \frac{\text{number of pulses}}{\Delta t}$$

then the number of pulses occurring during a time period proportional to a particular value of the independent variable will digitally represent the value of the dependent variable.

One embodiment of this concept employs a continually driven magnetic drum which has pulses so stored that the spacing between them varies sinusoidally. One pulse in the train of stored pulses is a reference pulse. The pulses are read from the drum continually and applied to a gate which is opened by the reference pulse. A pulse occurring later than the reference pulse by an increment of time proportional to the angle whose sine is to be digitally represented operates to close the gate. A counter counts the pulses which pass through the gate, thereby providing a digital representation of the sine of the angle. Since the value of the sine varies between maximum and minimum values, the direction of counting is reversed every 90° of shaft rotation, thereby causing the counter to count periodically from zero to some number and back down from that number to zero.

In addition to the above-described technique for producing a pulse train having sinusoidally spaced pulses, the present invention proposes two alternate pulse train producing techniques, neither of which requires a memory device. Elimination of the need for a memory device as a source of sinusoidally spaced pulses is desirable because the resolution qualities of memory devices, e.g. the minimum spacing possible between pulses stored on a magnetic drum, limits the accuracy of the digital count. In the first of these alternate techniques, a sinusoidally varying voltage is applied to a variable frequency oscillator which provides output pulses at a rate proportional to the instantaneous value of the applied voltage. The second of these alternate pulse producing techniques approximates a sine curve by line segments and then digitally represents the segments by counting and inhibiting clock pulses in predetermined patterns: where the slope of the sine curve is greatest, the clock pulses are inhibited least frequently; where the slope of the sine curve is least, the clock pulses are inhibited most frequently.

A principal object of the invention is to provide apparatus for converting the analog of an independent variable directly into a digital representation of a dependent variable relative thereto.

Another object of the invention is to provide apparatus for converting the analog of an angle directly into a digital representation of a sinusoidal function of that angle.

Another object of the invention is to provide apparatus for producing a digital representation of a dependent variable directly from an analog representation of an independent variable without need for a memory device.

Another object of the invention is to provide a train of pulses, the spacing of which is proportional to some function, by inhibiting, in a predetermined manner, certain clock pulses.

The invention will be described with reference to the figures wherein,

FIG. 1 is a block diagram of apparatus embodying the invention,

FIG. 2 is a diagram useful in describing the manner in which pulses are stored on a magnetic drum employed by the apparatus of FIG. 1, FIG. 3 is a block diagram of a presently preferred counting device useable with apparatus embodying the invention, FIG. 4 is a diagram useful in describing a technique for providing a digital representation of an independent variable, FIG. 5 is a schematic diagram of a device which, when employed with the apparatus of FIG. 1, provides another embodiment of the invention, FIG. 6 is a diagram useful in describing a method of providing a train of pulses which are spaced apart according to some function, and FIG. 7 is a block diagram of apparatus for providing a train of pulses by the method of FIG. 6.

Referring to FIG. 1, a motor 10 drives a generator 12 and a magnetic drum 14. The generator 12 output signal has a reference phase and is applied to a phase shifter 16. In this form of the invention the generator is a three phase generator and the phase shifter is a synchro, the legs of which are excited respectively by a different generator phase. The rotor of the synchro phase shifter 16 is rotatably positioned in proportion to an angle whose sine is to be digitally represented. With the rotor in a neutral, or reference position, the resultant voltage across the rotor winding has a particular phase, i.e. the reference phase. Rotation of the rotor, however, causes the phase of the rotor winding voltage to change in proportion to the amount that the rotor is rotated. Phase shifters of this type are described in detail in Analog-Digital Conversion Techniques, The Technology Press, Massachusetts Institute of Technology, Alfred K. Susskind, page 6–12.

The magnetic drum 14 has stored thereon a reference pulse 18 which is so disposed on the drum that it appears under a drum read-out head 20 at the same time that the unshifted resultant of the three generator voltages goes through zero. That is, with the rotor of the phase shifter 16 in its neutral position, the voltage across the rotor winding will be zero at the same time that the pulse 18 appears under the read-out head 20. Therefore, the pulse 18 serves as a reference from which the phase shift of the rotor winding voltage is measured.

Positioned about the surface of the drum 14 is a train of pulses 19, the spacing of which varies sinusoidally. The pulse train 19 is so disposed on the drum 14 that the frequency of appearance of pulses under a read-out head 22 is greatest at the time the reference pulse 18 appears under the head 20. See FIG. 2 which shows the time relationship between the unshifted generator 12 resultant voltage and the pulses which appear under the read-out heads 20 and 22.

The phase shifter 16 output voltage, whose phase shift with respect to the reference pulse 18 is proportional to the amount the phase shifter rotor is rotated, is applied to a pulse former 24. The pulse former 24, which may be of the type shown and described in Handbook of Electronics Control Circuits, John Markus, McGraw Hill Book Co., New York, page 127, provides a pulse whenever the voltage across the phase shifter rotor winding becomes zero. The stored pulse 18, when it appears under the read-out head 20, is applied to a flip-flop circuit 26 and causes the flip-flop circuit to have one of its two stable states. The output pulse from the pulse former 24 is also applied to the flip-flop circuit 26 and causes the flip-flop circuit to have the other of its two stable states. The sinusoidally spaced pulses 19 which are read from the magnetic drum 14 by the read-out head 22 are applied to a gate 28 which is opened when the flip-flop circuit 26 receives the reference pulse 18, i.e. when the flip-flop circuit has the first of the above-mentioned stable states, and is closed when the flip-flop circuit 26 receives the pulse from the pulse former 24, i.e. when the flip-flop circuit has the second of the above-mentioned stable states. The pulses which pass through the gate 28 are applied to a counting device 30, the description of which appears later.

In operation, the generator 12 provides three sinusoidally varying voltages, each 120° out-of-phase with the others. The three voltages are vectorially added by the phase shifter 16 to provide a sinusoidally varying resultant voltage, the phase of which depends on the rotational position of the phase shifter rotor. The magnetic drum 14 rotates at the same speed as the generator armature and is so disposed that the reference pulse 18 appears under the read-out head 20 at the same time that the instantaneous amplitude of the unshifted resultant voltage is zero, i.e. when the phase shifter rotor is at its reference position and the instantaneous amplitude of the voltage across rotor winding is zero. The reference pulse 18, when applied to the flip-flop circuit 26, causes that circuit to open the gate 28, thereby permitting the pulses read by the read-out head 22 to pass through the gate to the counting device 30. While the gate 28 is open, the instantaneous amplitude of the voltage across the rotor winding of the phase shifter 16 gradually approaches zero, the time between the instant the gate 28 opens and the instant that the amplitude of the phase shifter 16 output voltage becomes zero being proportional to the rotational position of the phase shifter rotor relative to its reference position. The pulse former 24 produces a pulse when the phase shifter output voltage becomes zero and applies this pulse to the flip-flop circuit 26 which closes the gate 28. The gate 28 is, therefore, open for a time proportional to the amount, i.e. the angle θ, that the phase shifter rotor is rotated from its reference position, and the number of pulses passing through the gate 28 is proportional to sin θ.

Since the sine increases from zero to a maximum and then back down to zero, the counting device 30 of FIG. 1 cannot count continually in one direction but, instead, must be capable of counting forwards and backwards. Referring to FIG. 3, a counting device having this ability employs an ordinary counter 32 consisting of a plurality of flip-flop circuits, e.g. the counter described and shown in "Arithmetic Operations In Digital Computers," R. K. Richards, D. Van Nostrand Co., Inc., New York, page 194, the respective states of which indicate the count in the counter. Connected to receive signals representing the respective states of the counter 32 flip-flop circuits is a logic circuit 34 which produces an output pulse whenever the counter reaches a particular count. In its simplest form, the logic circuit 34 is an AND circuit which provides a pulse whenever the counter 32 is "full," the full condition occurring, as will be described later, when the angle whose sine is being digitally represented is 90°, 180°, 270°, 360°, etc. The output pulse from the logic circuit 34 is applied to and clears the counter 32, i.e. it causes each flip-flop circuit in the counter to be in a "zero" state. The logic circuit 34 output pulse is applied also to a flip-flop circuit 36 which energizes a relay 38 in either one of two directions. Depending on the direction that the relay 38 is energized, switches 40a, 40b etc. apply signals representing the states of the various flip-flop circuits in the counter 32 directly to a read-out device (not shown) or to a register 42. The input pulses to the counter 32 from the gate 28 are applied, through a delay device and a switch 41, to the register 42 and operate to complement the count stored in the register 42, i.e. reverse the state of each flip-flop circuit in the register 42, after the count of the counter 32 is stored in the register 42. Signals representing the states of the various flip-flop circuits in the register 42 are applied, then, to the read-out device. At the instant the complemented count of the register 42 is read, the register 42 is cleared to make it ready to store and complement the net count in the counter 32. With the counter 32 of the type whose "full" count represents the sine of 90°, the counter 32, during the first quadrant of the sine curve, counts in an ascending manner and applies signals representing its count directly to the read-out device. At the instant the counter 32 becomes full, the logic circuit 34, i.e. the AND circuit, applies a pulse to the counter 32 which clears the counter. Therefore, the next arriving pulse (from the gate 28) causes the counter, again, to count in an ascending manner even though the value of the sine at this time should be descending. However, signals representing the states of the various flip-flop circuits in the counter 32 are applied, at this time not to the read-out device, but to the register 42. The count stored in the register, then, is complemented and read out. When, in digitally representing the sine of 90°, the counter 32 becomes full, e.g. when the count is 1111, it is cleared instantly and the next pulse applied to the counter 32 causes the count in the counter to be 0001. The count 0001 is stored immediately in the register 42 and then complemented, thereby providing the count 1110 which, as it should be, represents the next count after the count representing the sine of 90°. When the next pulse causes the count in the counter 32 to be 0010, the complemented register count will be 1101. The counter 32 continues to count in an ascending manner until it is again full, at which time, it is cleared and the relay 38 operates the switches 40a, 40b, etc. so that signals representing the count in the counter 32 may be applied directly to the read-out device.

Instead of utilizing a counter which becomes full when the count represents the maximum value of the sine, a counter which counts ad infinitum may be employed. In FIG. 4, for simplicity, the sine of 90° is represented by the number 1000. During the first quadrant of the sine curve, the count in the counter is read directly; during the second quadrant the count in the counter has the count representing the sine of 90° subtracted from it. This is done by adding the instantaneous count to the complement of the count representing the sine of 90°. The compliment of this sum is added then to the count representing the maximum value of the sine, i.e. the count representing the sine of 90° or 1000. The result of this procedure is a number which gradually backs down from 1000 to 0000, i.e. the sine of 180°. During the third quadrant of the sine curve, the count in the counter when the aforesaid number represents the sine of 180°, i.e. 1000, is subtracted from the instantaneous count in the counter. That is, the complement of 1000 is added to the instantaneous count throughout the third quadrant of the sine curve. However, since the sine during the third quadrant increases from 0000 to 1000, this number is not subtracted from the maximum value of the sine, i.e. 1000. During the fourth quadrant of the sine curve, the instantaneous count has subtracted therefrom the count which occurred when the sine of 270° was represented, the result of this subtraction being then subtracted from the maximum value of the sine, i.e. 1000. This operation is repeated over and over with the instantaneous count always having subtracted therefrom the count which occurred at the last occurring quadrant point. Further, during each even numbered quadrant, the result of this subtraction is subtracted from the maximum value of the sine.

As described above, the dependent variable digitally represented has been limited to the sine of an angle through which the rotor of the phase shifter 16 is turned. Obviously, though, the cosine of that angle may be likewise digitally represented by merely shifting the time phase of the reference pulse by 90°, e.g. by changing the angular position of the pulse 18 on the drum 14 by 90°. Further, the techniques described may be adapted readily to provide a digital representation of any dependent variable. For example, if the pulse spacing on the drum is varied as an independent function of a dependent variable X, and the rotor of the phase shifter 16 is rotated as a linear function of X, then the number of pulses passing through the gate 28 during one revolution of the drum will represent digitally the value of the dependent variable which corresponds to a particular value of the independent variable X, i.e. the amount the rotor is rotated. However, like the technique for producing a digital representation of the sine of an angle, means must be provided for reversing the direction of counting whenever the slope of the function changes its sense.

Referring to FIG. 5, a circuit which may be employed in place of the apparatus enclosed within the dashed line 100 of FIG. 1 comprises a function potentiometer 44, the wiper of which is driven by the motor 10 and which has a voltage thereon that varies according to some function. The voltage on the wiper is applied to a variable frequency oscillator 46 which provides output pulses at a frequency proportional to the instantaneous value of its applied voltage. Such a variable frequency oscillator may be a multivibrator of the type shown and described in Electronic and Radio Engineering, Frederick E. Terman, McGraw-Hill Publishing Company, New York, pages 628–630. If desired, for digital representations of sinusoidally varying functions, one of the generator 12 output voltages may be applied to the variable frequency oscillator 46 (instead of the voltage appearing on the potentiometer wiper).

In addition to the aforedescribed methods of producing pulses which are spaced apart in accordance with some function, the present invention proposes the following curve-fitting technique. Referring to FIG. 6, the plot of a function (curve A) which varies in some non-linear fashion is approximated by counting clock pulses and, whenever the clock pulse count differs from the instantaneous value of the function by more than some predetermined amount, an inhibitor prevents the count from increasing until the instantaneous value of the function again approximately equals the count. For example, up to point A of FIG. 6, the count approximately equals the value of the function. However, at point A, the value of the function starts to differ considerably from the clock pulse count. To continue to approximate curve A, every other clock pulse is inhibited between points A and B. At point B, the value of the function again starts to differ considerably from the clock pulse count. Therefore, after point B is reached, four consecutive clock pulses out of every five are inhibited. As is to be realized, FIG. 6 merely sets forth a mode of curve fitting, i.e. a technique to be employed in setting up apparatus for providing a train of pulses which are spaced apart according to some function. FIG. 7 shows a general arrangement of components which may be employed to provide the pulse spacing as required in FIG. 6. Clock pulses are applied to a slope register 48 which, by means of a logic circuit 50, applies a signal to a two-pole stepping switch 52 whenever the slope register 48 stores certain counts. Stepping switches of the type which may be employed by the invention are shown and described in "The Design of Switching Circuits," W. Keister, A. Ritchie and S. Washburn, D. Van Nostrand Co., Inc., Princeton, N.J., chapter 9. When the stepping switch 52 is in position "X," clock pulses are applied directly to a circuit, e.g. the gate 28, connected to the output terminal T. When the slope register 48 reaches a certain count, i.e. the count 11 in FIG. 6, the logic circuit 50 has an output pulse which moves the switch 52 to position "Y." In position "Y," the switch 52 applies the clock pulses to the terminal T through a slope simulator 54. The slope simulator 54 has a normally open gate 56 and a register 58, each of which receives the clock pulses. Signals representing the states of the various flip-flop circuits in the register 58 are applied to a logic circuit 60 which operates to produce an output pulse whenever the register 58 stores a certain count. The logic circuit 60 output pulse is applied to the gate 56 and operates to inhibit the next clock pulse applied to the gate. The logic circuit 60 output pulse is also applied to and clears the register 58. In providing the pulse spacing as required between points A and B of FIG. 6, the register 58 may be a simple flip-flop circuit which applied a gate closing signal to the gate 56 whenever the flip-flop circuit is in a particular state. Therefore, after point A of FIG. 6, only odd numbered clock pulses will pass through the gate 56. When the switch 52 is in position "Z," clock pulses are applied to the terminal T through a slope simulator 62, the clock pulses being applied to the slope simulator 62 being delayed by an interval of time equal to the time between clock pulses. The slope simulator 62 is similar to the slope simulator 54 except for the fact that the logic circuit of the slope simulator 62 permits its gate to remain open only for every fifth clock pulse. The pulses which pass through the slope simulator 62 are applied, like the pulses which pass through the slope simulator 54, to the gate 28. In operator, clock pulses are applied to the slope register 48 and to the gate 28 via switch contact "X." When the slope register 48 has a particular count stored therein, i.e. 11, the logic circuit 50 has an output pulse which steps the stepping switch 52 to its position "Y." With the switch 52 in position "Y," the slope simulator 54 becomes active. The first pulse applied to the gate 56 passes therethrough and also causes the register 58 to store a count. The next pulse applied to the register 58 and the gate 56 causes the logic circuit 60 to respond and close the gate 56, thereby preventing a signal from being applied to the gate 28. At this time, the register 58 is cleared. The next pulse applied to the gate 56 passes through the gate; in addition, the register, again, stores a count. This operation is repeated over and over again until the slope register 48, which responds to every clock pulse, has a new "particular" count, i.e. the count 0111, at which time the stepping switch 52 moves to its position "Z." With the switch 52 in its position "Z," the slope simulator 62 becomes operative and, like the slope simulator 54, inhibits certain clock pulses, i.e. every fifth pulse is permitted to pass through the gate of the slope simulator 62.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for converting a signal representing the analog of an independent variable to a digital word representing the dependent variable relative thereto comprising means for producing a pulse train wherein the spacing between the pulses in said train is proportional to the rate that said dependent variable varies relative to said independent variable, means for producing a reference signal whose occurrence in time substantially coincides with a pulse in said train representing a reference value for said independent variable, means for producing a signal later than said reference signal by an increment of time proportional to the value of the independent variable, and means for counting the pulses in said train which occur during said time increment, said means producing a pulse train comprising means for producing clock pulses at a rate as fast as the highest rate at which said dependent variable varies with respect to said independent variable, a gate for receiving said clock pulses and applying its output to said counting means, and means responsive when the number of clock pulses counted exceeds the instantaneous value of the dependent variable by a predetermined amount to inhibit succeeding clock pulses from passing through said gate until the instantaneous value of the dependent variable is substantially the same as the count of said counting means.

2. Apparatus for converting a signal representing the analog of an angle variable with respect to time to a digital word representing a sinusoidally varying function of that angle comprising means for producing a pulse train wherein the spacing between the pulses in said train varies sinusoidally, means for identifying a pulse in said train as representative of a reference angle, and means for counting the pulses occurring immediately after said reference pulse during a time interval proportional to the magnitude of the angle whose function is being digitally represented, said count being the digital representation of the sinusoidally varying function, said means producing a pulse train comprising means for producing clock pulses at a rate as fast as the highest rate at which said sinusoidal function varies with respect to said variable angle, a gate for receiving said clock pulses and applying its output to said counting means, and means responsive when the number of clock pulses counted exceeds the instantaneous value of the sinusoidally varying function by a predetermined amount to inhibit succeeding clock pulses from passing through said gate until the instantaneous value of the sinusoidally varying function is substantially the same as the count of said counting means.

References Cited by the Examiner
UNITED STATES PATENTS

| | | | |
|---|---|---|---|
| 2,471,788 | 5/49 | Snyder et al. | 340—206 |
| 2,774,957 | 12/56 | Towner | 324—205 |
| 2,886,717 | 5/59 | Williamson | 235—92 |
| 2,901,170 | 8/59 | Poole | 340—206 |
| 2,921,740 | 1/60 | Dobbin et al. | 235—197 |
| 2,987,717 | 6/61 | Altonji et al. | 340—347 |
| 3,022,500 | 2/62 | Stupar | 340—347 |

OTHER REFERENCES

"Sine-Cosine Angular Position Encoders," by Spaulding, from IRE Trans. on clusts. 6/56, pages 161–167.

MALCOLM A. MORRISON, *Primary Examiner.*

STEPHEN W. CAPELLI, *Examiner.*